US005938073A

United States Patent [19]

Chang

[11] Patent Number: 5,938,073

[45] Date of Patent: Aug. 17, 1999

[54] CARD STACKING AND CONVEYANCE STRUCTURE FOR AUTOMATIC CARD VENDING MACHINES

[75] Inventor: Yuan Fong Chang, Taipei, Taiwan

[73] Assignee: Gamemax Corporation, Taipei, Taiwan

[21] Appl. No.: 08/925,462

[22] Filed: Sep. 8, 1997

[51] Int. Cl.[6] .................................................... B65G 59/00

[52] U.S. Cl. ............................................ 221/259; 221/277

[58] Field of Search .................................... 221/257, 277, 221/203, 210, 258; 271/35, 109, 131, 139

[56] References Cited

U.S. PATENT DOCUMENTS 4,635,922 1/1987 Roetter et al. .......................... 221/259

5,562,402 10/1996 Mato ....................................... 221/259

*Primary Examiner*—Kenneth Noland

*Attorney, Agent, or Firm*—Smith, Gambrell & Russell; Beveridge, DeGrandi, Weilacher & Young Intellectual Property Group

[57] ABSTRACT

A card stacking and conveyance structure adapted for use in automatic card vending machines such as telephone card vending machines, including a securing seat, a conveyance device, and a press plate. Cards are disposed in a receiving space of the securing seat. The cards will actuate a switch to connect the relevant circuit elements. When a control circuit board receives a card discharge signal, it will actuate a motor which rotates a gear set to bring a roller set into operation. A card will then slide forwardly and gradually pass through a clearance between a front cover plate and a bottom cover plate due to the action of a first roller and a second roller, and then pass through a seam between a third roller and a fourth roller to a card slot of the vending machine.

4 Claims, 6 Drawing Sheets

CARD STACKING AND CONVEYANCE STRUCTURE FOR AUTOMATIC CARD VENDING MACHINES

BACKGROUND OF THE INVENTION (a) Field of the Invention

The present invention relates generally to a card stacking and conveyance structure for card vending machines, and more particularly to a conveyance structure utilized by a card stacking apparatus adapted for use in an automatic vending machine for vending cards like telephone cards.

(b) Description of the Prior Art

Telephone card vending machines are newly launched in the market. Therefore, their assembly and functions are yet to be improved. The card stacking apparatus in the card vending machine should enable the cards to be discharged or released smoothly and may match cards of different specifications, without the problem of sending out two cards at the same time.

SUMMARY OF THE INVENTION

Accordingly, a primary object of the present invention is to provide a conveyance structure for automatic card vending machines which may enable the cards to be conveyed and discharged smoothly and match cards of different specification, and which do not easily break down.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
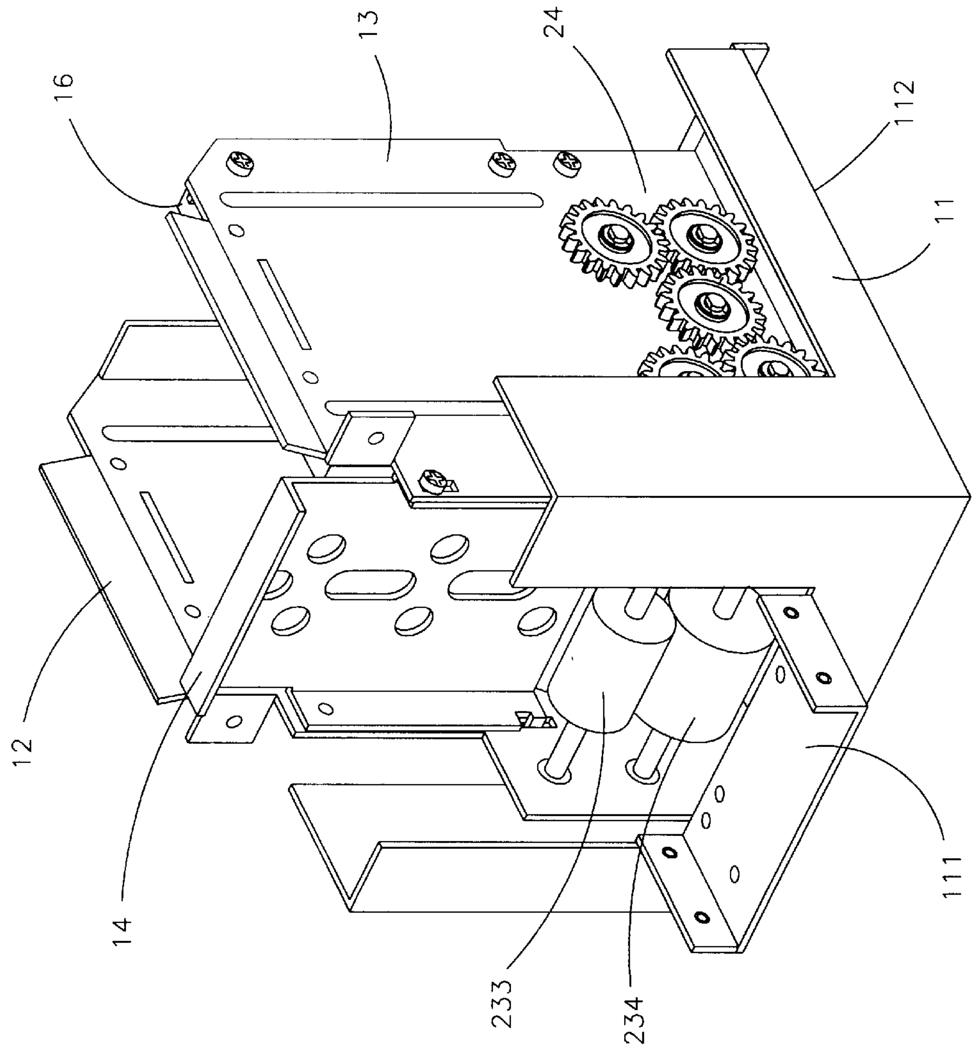
FIG. 1 is a perspective outer view of the present invention.
Figure 2:
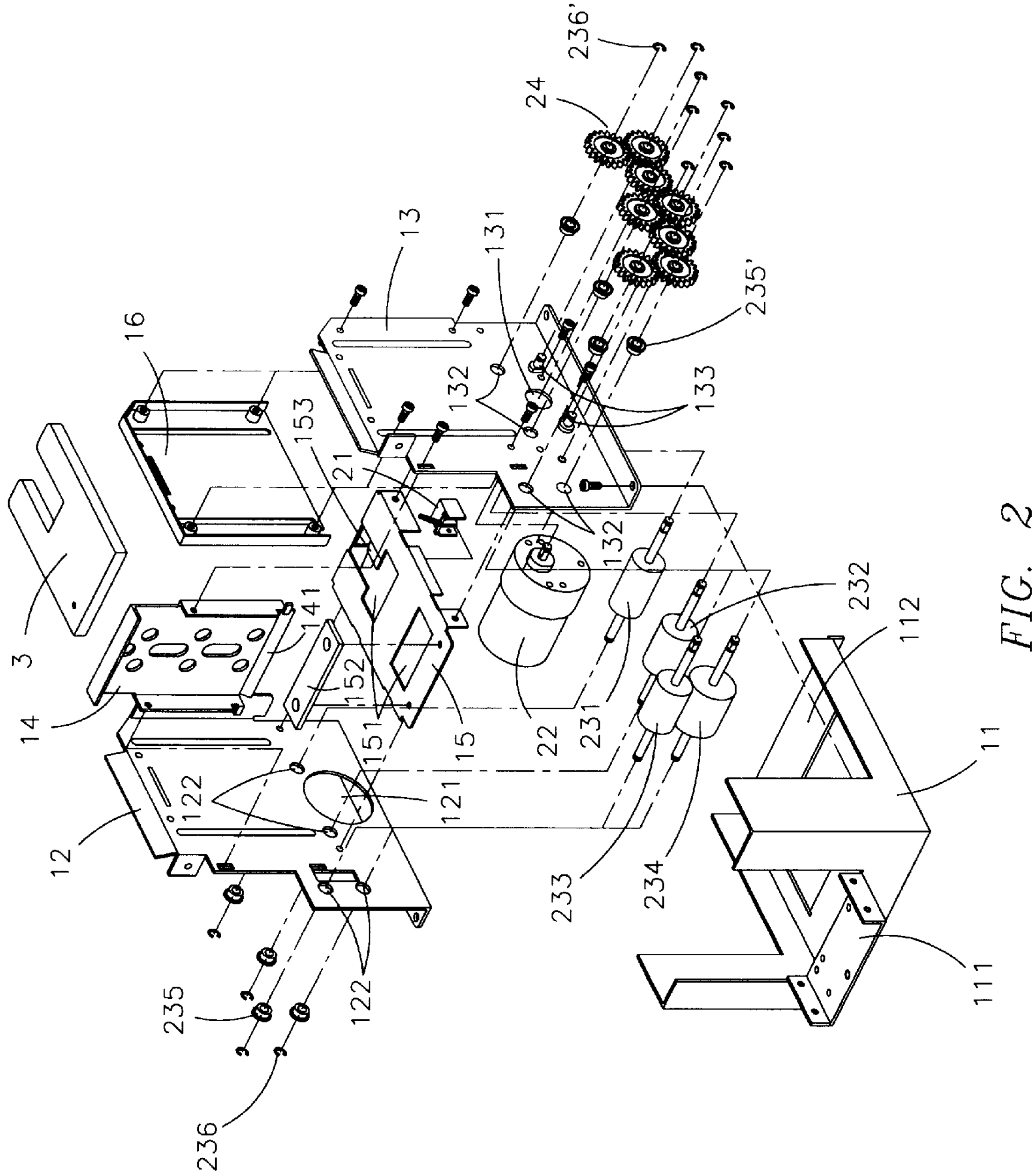
FIG. 2 is a perspective exploded view of the present invention.

With reference to FIGS. 1 and 2, which are the perspective outer view and exploded view of the invention respectively, it can be seen that the present invention essentially comprises a securing seat 1, a conveyance device 2 the components of which are positioned in the securing seat 1, and a press plate 3.

The securing seat 1 has a main frame 11 with a first securing portion 111, a left cover plate 12, a right cover plate 13, and a front cover plate 14. The left, right and front cover plates 12, 13, and 14 are all disposed at an upper side of the first securing portion 111. The main frame 11 further has a second securing portion 112 on which a card discharge mechanism A is mounted. A bottom cover 15 is horizontally and fixedly provided between the left and right cover plates 12, 13, such that the bottom cover 15 and the second securing portion 112 defines a space therebetween. The space receives a motor 22, and a first roller 231, and a second roller 232.

The left cover plate 12 is provided with a hollowed hole 121 thereon; the hollowed hole 121 facilitates the passing of lead wires or maintenance of the motor 22. The left cover plate 12 is further provided with four axial holes 122 thereon at suitable positions for receiving bearing sleeves 235 which are mounted therein.

The right cover plate 13 is provided with a motor securing hole 131 thereon to facilitate mounting of the motor 22 thereon, such that a drive spindle at a front end of the motor 22 projects on the outer surface of the right cover plate 13. Four axial holes 132 are formed on the right cover plate 13 at positions corresponding to those of the axial holes 122 of the left cover plate 12. Four bearing sleeves 235' are disposed in the axial holes 132. Besides, a plurality of posts 133 are fixedly on the right cover plate 13 at suitable positions for mounting of a gear set 24 thereon.

The front cover plate 14 is longitudinally fixed between the left cover plate 12 and the right cover plate 13, such that it may be finely adjusted upwardly or downwardly to allow adjustment of the size of a clearance formed between a guide portion 141 at a lower portion of the front cover plate 14 and a raised portion 152 of the bottom cover 15. The first and second rollers 231, 232, as well as a third roller 233, a fourth roller 234 are respectively arranged at both sides of the front cover plate 14. Besides, a bottom end of the front cover plate 14 bends outwardly to form a forwardly curved surface to constitute the above-mentioned guide portion 141.

The bottom cover plate 15 is provided with two slots 151 so that outer circumferential rims of the first and second rollers 231, 232 may project a certain distance from the surface of the bottom cover plate 152 via the slots 151. The above-mentioned raised portion is disposed at an upper surface of a front side of the bottom cover plate 15. For matching the height required during conveyance of the cards. A mounting slot 153 is further disposed at a rear side of the bottom cover plate 15 for mounting of a switch 21 of the conveyance device 2 thereon.

There is also provided an expandable packing plate 16, which is fixedly provided at an inner surface of the right cover plate 14. The expandable packing plate 16 may be optionally installed in response to the size of the cards.

With respect to the conveyance device 2, it includes the above-mentioned switch 21, motor 22, a roller set 23, and the above-mentioned gear set 24. As described above, the switch is disposed on the mounting slot 153 at the rear side of the bottom cover plate 15; the motor 22 is secured in the motor securing hole 131; the roller set 23 is secured between the left cover plate 12 and the right cover plate 13 by means of the bearing sleeves 235, 235', and is further secured in position by E-rings 236, 236'. The first roller 231 and the second rollers 232 are flatly disposed below the bottom cover plate 15 and project from the upper sides of the slots 151. The third roller 233 and the fourth roller 234 are longitudinally and vertically disposed at the front ends of the left cover plate 12 and the right cover plate 13, and the motor 22 and the roller set 23 are linked up by the gear set 24 for driving the roller set 23. A joint or seam formed between the third roller 233 and the fourth roller 234 is at a position slightly lower than the upper peripheries of the first roller 231 and the second roller 232 so that the cards may be smoothly pushed out of a card slot of the card discharge mechanism A at the upper side of the first securing portion 111 of the main frame 11.

The press plate 3 is a block structure having a suitable weight and is provided for exerting a pressure on the cards below, so that the friction between the second roller 232 and the cards during discharge of cards may be enhanced to thereby achieve the object of smooth discharge of cards.

Figure 3:
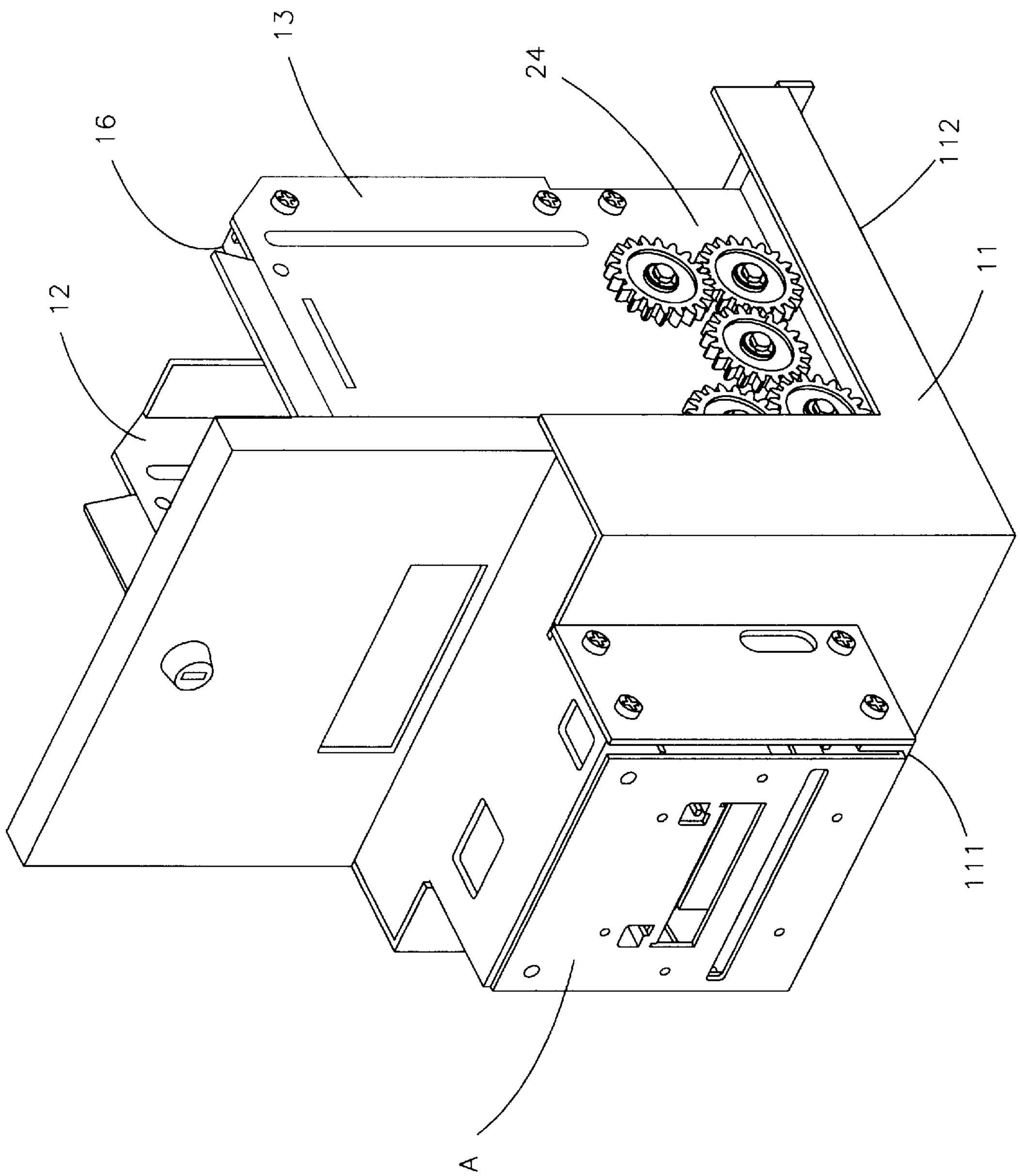
FIG. 3 is a perspective outer view of the present invention and a card discharge mechanism.
Figure 4:
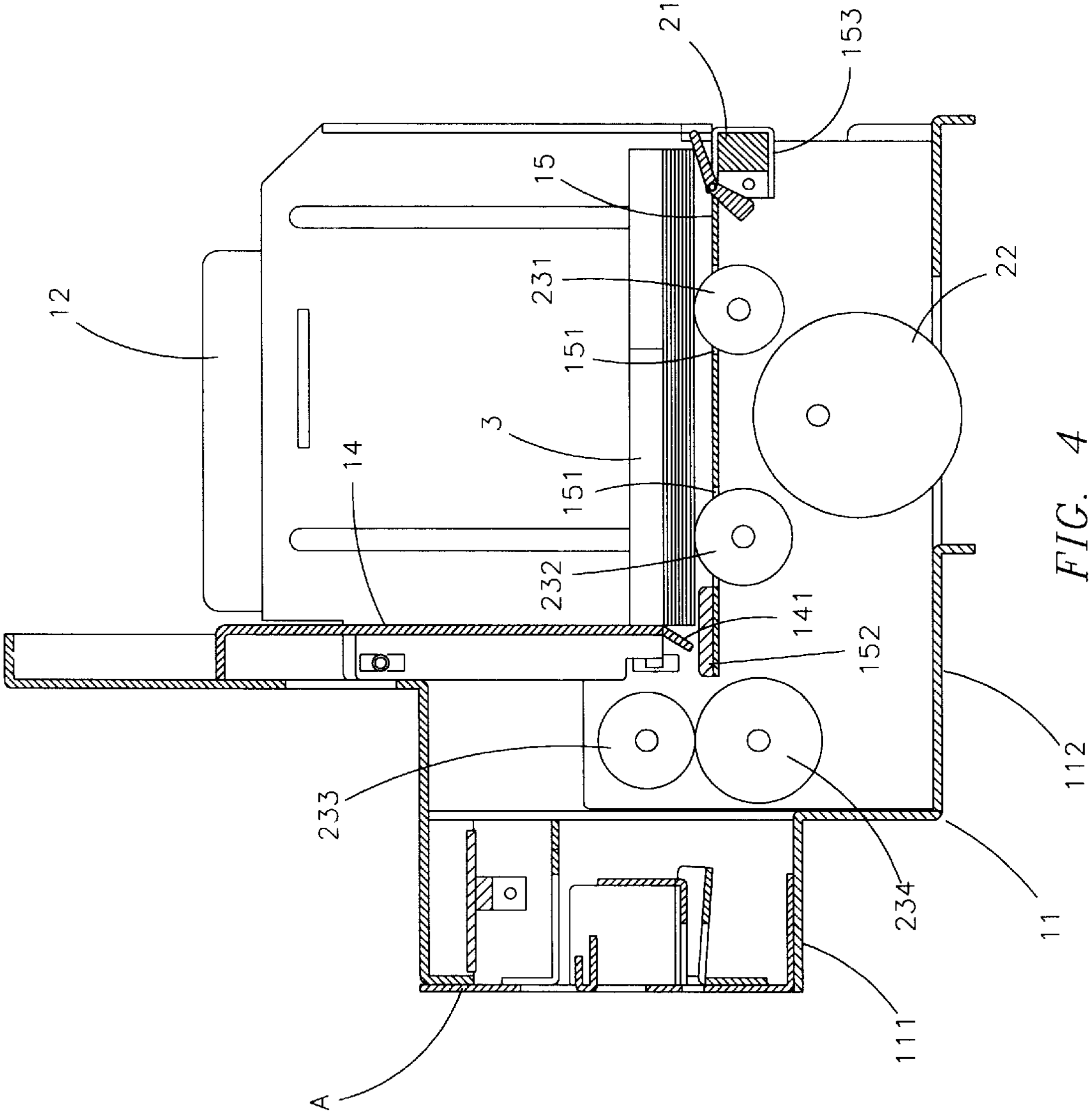
FIG. 4 is a schematic sectional view of the present invention before discharge of a card.
Figure 5:
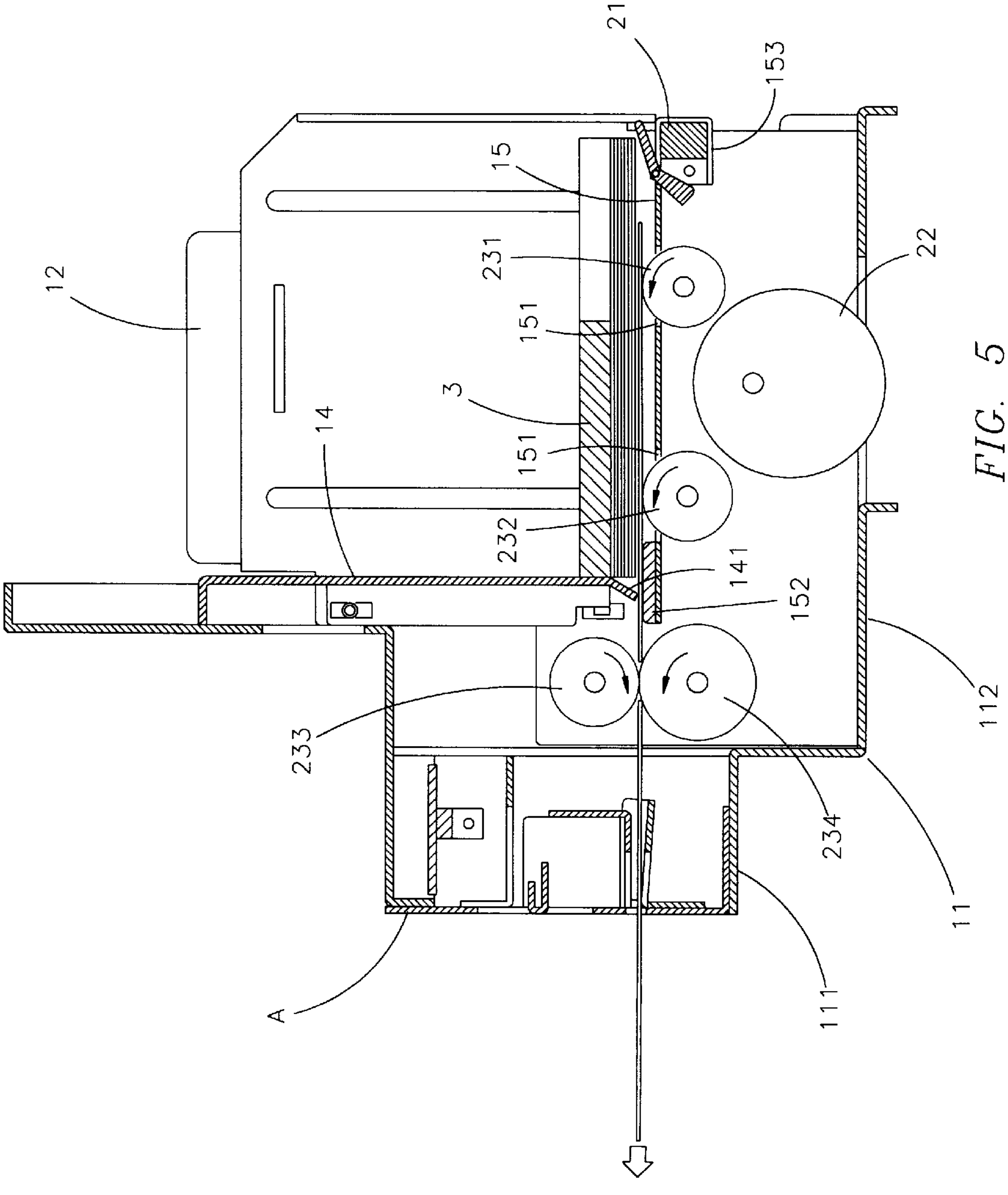
FIG. 5 is a schematic sectional view of the present invention after discharge of a card.
Figure 6:
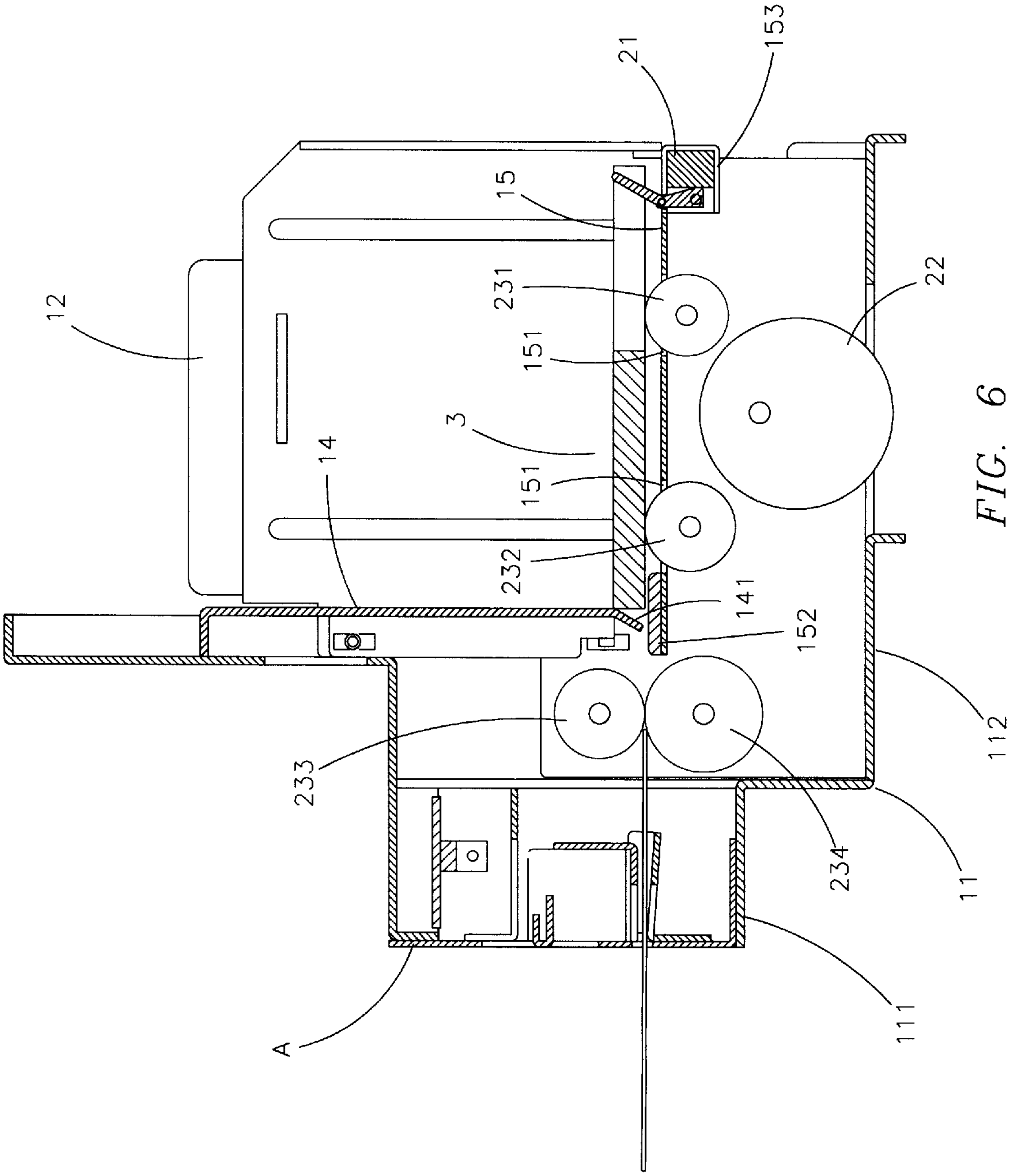
FIG. 6 is a schematic sectional view of the present invention without the cards.

With reference to FIGS. 3, 4, 5, which show the present invention in an assembled state, during operation, the cards are firstly placed in an rectangular slot formed by the securing seat 1 after assembly, then the press plate 3 are placed on top of the cards. At this point, the cards will exert a pressure on the switch 21, notifying a control circuit board that the cards have been placed on the switch 21. When there is an external signal which connects the other circuit parts, the motor will, after connection with electric currents, bring the components of the gear set 24 to rotate, causing the roller set 23 to rotate on its own, in which when the first roller 231 and the second roller 232 rotates, the cards will slidably displace forwardly and pass through the clearance defined between the guide portion 141 and the raised portion 152, and further through the seam between the third roller 233 and the fourth roller 234, and finally to the card slot of the discharge mechanism A, thus accomplishing the operation of card discharge. Referring to FIG. 6, if all the cards have been sold out, the switch 21 will pop up and close, and the circuit board is notified that the cards have been sold out and that it should stop card discharging operations. At the same time, an indicator light on the outside of the vending machine will indicate that the cards in the machine have been sold out. (As such is not a feature of the invention and is mentioned herein for reference only, it is not illustrated in the drawings.)

Referring to FIGS. 4 and 5, the first roller 231 and the third roller 233 are made of relatively hard (higher density) materials such as medium, hard rubber), whereas the second roller 232 and the fourth roller 234 are made of relatively soft (lower density) materials such as soft rubber. Therefore, when the cards displace forwardly, they can be brought to move by the second roller 232 generating greater frictional force, while the first roller 231 of a lower friction coefficient may enable the cards to advance smoothly. And when the cards pass through the clearance between the third and fourth rollers 233, 234, due to the difference in the external diameters and friction coefficients of the rollers, the cards may easily pass through the clearance.

Although the present invention has been illustrated and described with reference to the preferred embodiment thereof, it should be understood that it is in no way limited to the details of such embodiment but is capable of numerous modifications within the scope of the appended claims.

What is claimed is:

1. A card stacking and conveyance structure for automatic card vending machines, comprising:

a securing seat, having a first securing portion for mounting of a card discharge mechanism thereon, a second securing portion on which a left cover plate, a right cover plate, and a front cover are assembled on an upper side thereof, a bottom cover plate being horizontally fixed between said left cover plate and said right cover plate, said second securing portion defining a space with said bottom cover plate, said left cover plate and said right cover plate being respectively provided with four symmetrical axial holes on their respective surfaces, said left cover plate further having a motor securing hole and a plurality of posts at an outer side thereof, said cover plate being longitudinally disposed between said left cover plate and said right cover plate, said front cover plate further having a bottom end bending forwardly in a curve surface to form a guide portion, and said bottom cover plate further having two slots provided at an upper surface thereof, a raised portion disposed at a surface of a front end thereof, and a mounting slot at a rear side thereof;

a conveyance device, having a switch located in said mounting slot of said bottom cover plate, a motor secured in said motor securing hole, and a roller set secured between said left cover plate and said right cover plate by means of bearing sleeves and positioned in place by E-rings, said motor and said roller set being received in said space defined between said second securing portion and said bottom cover plate, said roller set including a first roller and a second roller disposed at one side of said front cover plate, and a third roller and a fourth roller disposed at the other side of said front cover plate, said first roller and said second roller being flatly disposed below said bottom cover plate such that they project from said slots to expose on the surface of said bottom cover plate, said third roller and said fourth roller being longitudinally and vertically disposed in front of said left cover plate and said right cover plate, said conveyance device further having a gear set connecting said motor and said roller set for transmission purposes, said third roller and said fourth roller defining a clearance therebetween which is located at a level slightly lower than the upper peripheries of said first roller and said second roller; and a press plate, being a block structure with a suitable weight so that it may exert a pressure on the cards.

2. A card stacking and conveyance structure for automatic card vending machines as claimed in claim 1, wherein said front cover plate of said securing seat is adjustable so that a clearance defined between said guide portion of said front cover plate and said raised portion of said bottom cover plate may be adjusted to match cards of various thicknesses.

3. A card stacking and conveyance structure for automatic card vending machines as claimed in claim 1, wherein said right cover plate of said securing seat may be provided with an expandable packing pad at an inner surface thereof for matching the width of the cards.

4. A card stacking and conveyance structure for automatic card vending machines as claimed in claim 1, wherein said first roller and said third roller are made of materials of relatively high density, whereas said second roller and said fourth roller are made of materials of relatively low density to thereby achieve smooth conveyance of the cards.

* * * * *